AUTOMATIC GROUP SELECTOR TAPE INDEXING MECHANISM

INVENTORS N. R. HALL
T. B. PRINCE
J. F. RITCHEY
BY E. J. Olinder
ATTORNEY

Feb. 18, 1969 N. R. HALL ET AL 3,428,758

AUTOMATIC GROUP SELECTOR TAPE INDEXING MECHANISM

Filed Sept. 14, 1965 Sheet 2 of 8

Feb. 18, 1969 N. R. HALL ET AL 3,428,758

AUTOMATIC GROUP SELECTOR TAPE INDEXING MECHANISM

Filed Sept. 14, 1965 Sheet 8 of 8

United States Patent Office 3,428,758

Patented Feb. 18, 1969

3,428,758

AUTOMATIC GROUP SELECTOR TAPE INDEXING MECHANISM

Norris R. Hall and Terry B. Prince, Indianapolis, and James F. Ritchey, Carmel, Ind., assignors to Bell Telephone Laboratories, Incorporated, New York, N.Y., a corporation of New York Filed Sept. 14, 1965, Ser. No. 487,264

U.S. Cl. 179—90 6 Claims

Int. Cl. H04m 1/46

ABSTRACT OF THE DISCLOSURE

In a repertory dialer telephone set an automatic group selector indexing mechanism is employed for positioning the name display tape with respect to the display window and the recording tape with respect to the record-reproduce head at a central position in a preselected group of names, such as the group comprising all names with a common initial letter. A motor drive is started by positioning a group selector indicator and is stopped automatically at the selected group. Vernier adjustment means may be manual, motor driven step, or motor driven slow continuous scan.

This invention relates to power driven selector mechanisms for tape transports and, more particularly, to mechanisms of this type employed in telephone repertory dialers.

The effective utilization of information stored on rolled tape, whether that information be in the form of magnetized or imprinted indicia, requires some means of ready access to the information so stored. The problem is particularly complex where, as in some types of repertory dialer telephone sets, magnetic tape is used to store signal indicia of directory numbers that may be transmitted directly without dialing and where the names corresponding to the stored numbers are imprinted on paper tape. Accordingly, the problem of providing ready access to the stored information has a number of aspects that involve positioning the magnetic tape, positioning the paper tape and synchronizing the drive of both tapes to ensure proper correspondence between the two. Access means known heretofore have been effective in locating stored information in relatively low capacity storage arrangements involving approximately 50 to 100 directory numbers and names. Current requirements, however, demand storage capacity to accommodate up to 1,000 names and numbers. Known access arrangements are generally ineffective in such high capacity systems in that the requisite access speed has been attained only at the expense of undue complexity and reduced reliability.

A principal object of this invention, therefore, is to facilitate the control of tape transport mechanisms.

Another object is to increase the speed with which a tape transport mechanism may be shifted to a preselected reference position.

An additional object is to simplify the recording tape advancing means employed in repertory dialer telephone sets.

A further object is to enhance the convenience of recording tape advancing means employed in repertory dialer telephone sets.

These and other objects of the invention are attained is one illustrative embodiment wherein a power driven mechanism is employed to position synchronously a magnetic tape transport and a corresponding paper tape transport. In accordance with the principles of the invention, a first set of controls is utilized to initiate the operation of the power driven mechanism in a coarse or group selector mode of operation. In the coarse mode the transports are driven and stopped automatically when correspondence is attained between a reference position and a preselected group of indicia on the tapes. A second control means is utilized for operation in a fine-adjust or vernier mode. In the vernier mode the transports are driven until the operator observes correspondence between a particular preselected indicia, within a prepositioned group of indicia and a reference position, at which point the vernier control is manually released to stop the drive.

In one embodiment of the invention the driving mechanism is manually rather than motor powered in the vernier mode. In accordance with the variant of the invention that utilizes a motor driven mechanism in the vernier mode, a continuous, slow speed driving action may be employed, whereas a relatively high speed drive is employed in the coarse or group selector mode. Alternatively, in accordance with the invention, power drive in the vernier mode may be supplied in the form of a stepping action.

One aspect of the invention involves the utilization of a selector wheel marked on its periphery, alphabetically for example, to correspond with alphabetical groupings of names imprinted on the index or display tape and with associated groupings of signal indicia of directory numbers recorded on the magnetic tape. Logic for the system is provided in part by a circuit disc in combination with a set of brush type contacts that are mounted on the selector wheel. Circuit paths among the contacts that control the application of power to the system are determined by the pattern of conductive and nonconductive areas on the disc. Operation is started by offsetting the selector wheel rotationally with respect to the disc. The drive mechanism that positions the tape transports also provides a rotational drive for the circuit disc in relation to the selector wheel so that the disc, in effect, chases the selector wheel until the preselected group position is attained and the disc is restored to a neutral rotational position in relation to the selector wheel.

Another aspect of the invention relates to the means for controlling the direction of drive. In one embodiment drive direction is established by the circuit disc and brush contacts in combination with a motor having a single direction of drive and a dual solenoid arrangement. In another embodiment, a reversible motor and a single solenoid are employed.

A feature of the invention is the utilization of a power actuated means in a repertory dialer for locating a preselected group of recorded subscriber names in combination with a manual means for locating a particular recorded subscriber in that group.

Another feature is a power actuated means for applying a continuous driving force to the recording medium of a repertory dialer until a preselected block of recorded indicia is shifted to a reference position in combination with either power or manually actuated slow speed drive positioning means for locating a particular recorded indicia within the preselected block.

A further feature pertains to a manually positionable selector wheel in a telephone repertory dialer that operates in conjunction with a circuit logic disc. The displacement of the selector wheel with respect to the concentrically mounted circuit disc is a measure of the duration of driving power required to position magnetic and imprinted tape transports, so that a preselected group of tape recorded indicia is made to correspond to a reference position.

These and other objects and features will be fully apprehended from the following detailed description of a number of illustrative embodiments of the invention and from the drawing in which.

Figure 1:
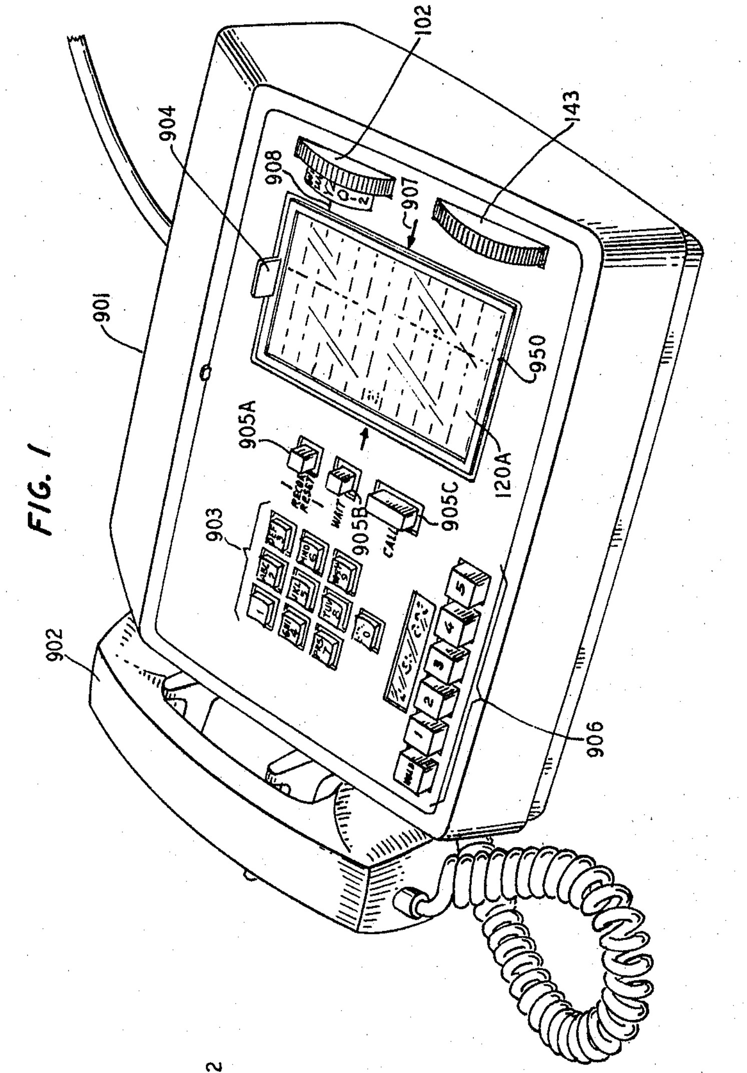
FIG. 1 is a perspective view of a telephone repertory dialer that employs a selector mechanism in accordance with a first form of the invention.

A repertory dialer telephone set of the type wherein a selector mechanism in accordance with the invention may advantageously be employed is shown in FIG. 1. Such a set includes a housing 901 with means for mounting a conventional handset 902. The mode of operation is controlled by record-reset button 905A, wait button 905B and call button 905C. With handset 902 off-hook, operation of TOUCH-TONE pushbuttons 903 effects the generation of conventional multifrequency dial signals and the application of such signals to the telephone line. With handset 902 on-hook and button 905A operated, the operation of push-buttons 903 results in the storage of signal indicia of the dialed directory number. A translating circuit, not shown, provides a means for converting from the 3 x 4 code of the pushbutton dial to a modified binary or *n*-out-of-4 code for recording on a magnetic tape 116A, FIG. 3. Tape 116A is provided with 4 longitudinal channels, and it is the presence or absence of a pulse in each of the 4 channels in a single transverse row that establishes the identity of a recorded number. For each number so recorded, a printed or type-written notation of the corresponding name is entered on display tape 120A, FIGS. 1 and 3. Display tape 120A is visible through a display window 950. Display window 950 may be removed by pulling on a holding tab 904 which then provides access to display tape 120A.

Figure 3:
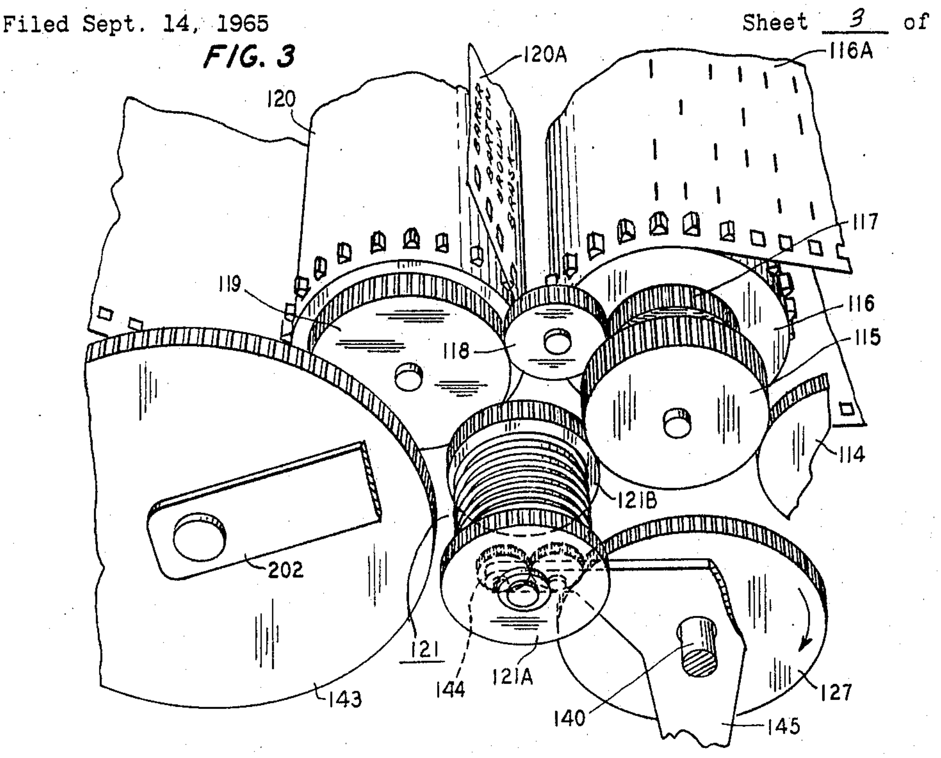
FIG. 3 is a mechanical schematic diagram, shown in perspective, of the tape sprocket drive portion of the mechanism shown in FIG. 2.

Display tape 120A and its associated mounting and driving mechanism, shown in FIG. 3, may conveniently be housed in a tray or basket-like container, not shown, to facilitate its removal. If desired, the display tape 120A may then easily be positioned on a typewriter platen so that the names corresponding to recorded directory numbers may be typed thereon.

The principles of the invention disclosed herein reside primarily in the apparatus that is employed to store, select and display the name and number of a party when automatic dialing from the repertory is desired. The controls for the selector mechanism include a coarse or slewing mode group selector wheel 102 and a fine-adjust or vernier mode individual name selector wheel 143. In a dialer of the type shown in FIG. 1, several hundred names and corresponding directory numbers may be recorded.

The names recorded on display tape 120A and the corresponding signal indicia on magnetic tape 116A, FIG. 3, may conveniently be arranged in groups, such as alphabetical groups, for example. In accordance with the invention, group designating characters, such as the letters of the alphabet, may be indicated on the inside rim of selector wheel 102. When selector wheel 102 is turned so that a particular group designating character corresponds to reference marker 908, a motor powered mechanism, shown in FIG. 2, drives display tape 120A in synchronism with magnetic tape 116A, FIG. 3, until the recorded name that is in the approximate center of the selected group corresponds to reference marker 907. At that point the mechanism stops automatically.

Figure 10:
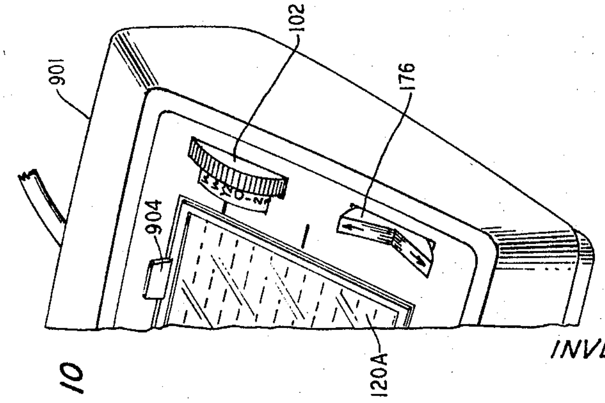
FIG. 10 is a partial view in perspective of a repertory dialer embodying a selector mechanism in accordance with the second form of the invention shown in FIGS. 6 and 7.

The particular desired name and number in the preselected group is positioned, in accordance with the invention, by the operation of selector wheel 143. Turning selector wheel 143 results in the application of manual driving force to the selector mechanism so that the name of the party to be called may be positioned visually at marker 907. Since the tapes 120A and 116A are driven synchronously, the name indicated by marker 907 corresponds to the signal indicia on tape 116A that is positioned directly over a 4-track record-reproduce head 139, shown in FIG. 4. In a form of the invention that utilizes a power drive for the fine-adjust or vernier mode, a rocker switch 176, FIG. 10, may be employed conveniently in lieu of selector wheel 143, FIG. 1.

Figure 2:
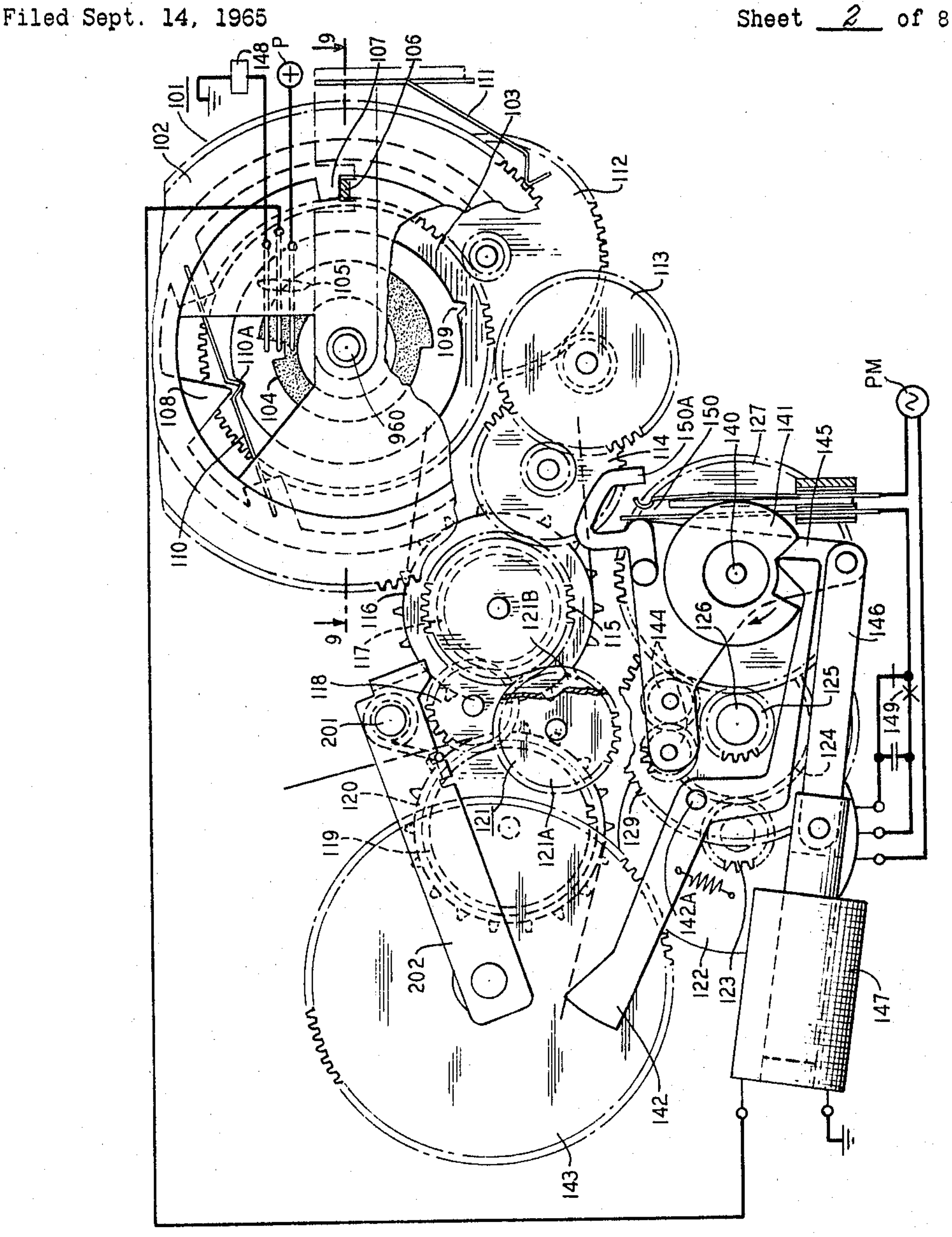
FIG. 2 is a combined electrical and mechanical schematic diagram of the mechanism employed in the repertory dialer shown in FIG. 1.
Figure 9:
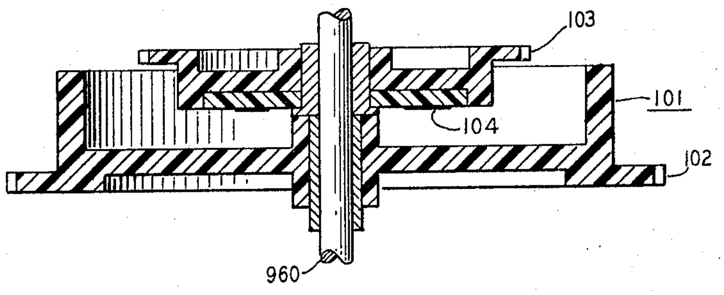
FIG. 9 is a cross-section view of the selector wheel and circuit disc assembly shown in FIG. 2 taken along the line 9—9 indicated by the small arrows.

The details of the mechanism utilized in accordance with the invention to effect the operations indicated above may best be described in terms of the schematic diagram shown in FIG. 2. Selector wheel 102 and circuit disc 104 are mounted concentrically for both independent and synchronous movement on shaft 960. The details of this arrangement are shown in FIG. 9. When selector wheel 102 is turned manually, as described above, to locate a particular group, detent spring 110 is disengaged from its accommodating notch 110A, overriding detent 111, and selector wheel 102 is offset rotationally from circuit disc 104. When the desired location is reached, detent 111 operates to maintain selector wheel 102 in the position at which it is stopped.

The brush contact group 105, which includes individual brush contacts 11A, 11B and 11C, is mounted on selector wheel 102 and, accordingly, shifts position with respect to circuit disc 104 when selector wheel 102 is rotated. Contacts 11A, 11B and 11C are in conductive contact with circuit disc 104. The pattern of conductive and nonconductive areas on the face of disc 104 determines whether or not a conductive path is established between or among the individual brush contacts 11A, 11B and 11C. In accordance with the invention, brush contact group 105 in combination with circuit disc 104 are utilized uniquely to control the application, direction and termination of driving force to the system. When selector wheel 102 is rotated in a counterclockwise direction, a circuit is completed between contacts 11B and 11C for the operation of a solenoid 147 from power source P. Solenoid 147 operates switch 150 through switch actuator 150A that is mounted on idler arm 145 which, in turn, is driven by solenoid connecting link 146. Switch 150 completes a conductive path between a reversible motor 122 and a power source PM.

Figure 11:
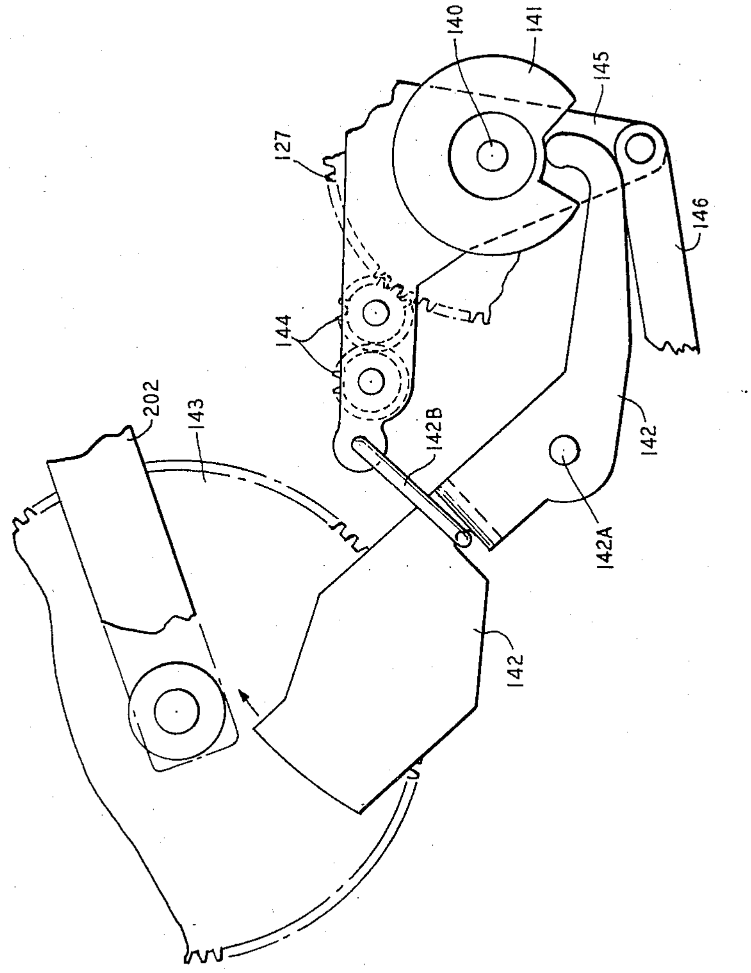
FIG. 11 is an enlarged and detailed view of a part of the mechanism shown in FIG. 2.

The operation of solenoid 147 and idler arm 145 also positions idler gears 144 into meshing relation with gear 121B of clutch assembly 121. The details of this assembly are shown in FIG. 3. The purpose of clutch assembly 121 is to prevent pulling the tapes off their respective drums should the tapes be manually advanced to their ends. Selector wheel 143 is prevented from meshing with gear 121B at the same time that gear 121B is being driven during the coarse positioning mode of operation by a lock-out arm 142, shown in FIGS. 2 and 11, which is pulled up by a link 142B, shown in FIG. 11 only, rotatably affixed to an idler arm 145. Link 142B rotates lock-out arm 142 whenever idler arm 145 is rotated. When lock-out arm 142 is rotated by cam 141, idler arm 145 is not rotated. Lock-out arm 142 has a gravity return.

Motor 122 drives through gears 123, 124, 125 and 127, idler gears 144 and thence through gears 121B, 115, 117, 118 and 119 to position magnetic tape sprocket 116 and display tape sprocket 120, FIG. 3. The gear train drive described may best be followed from FIG. 2 when taken in conjunction with both FIGS. 3 and 4.

Figure 4:
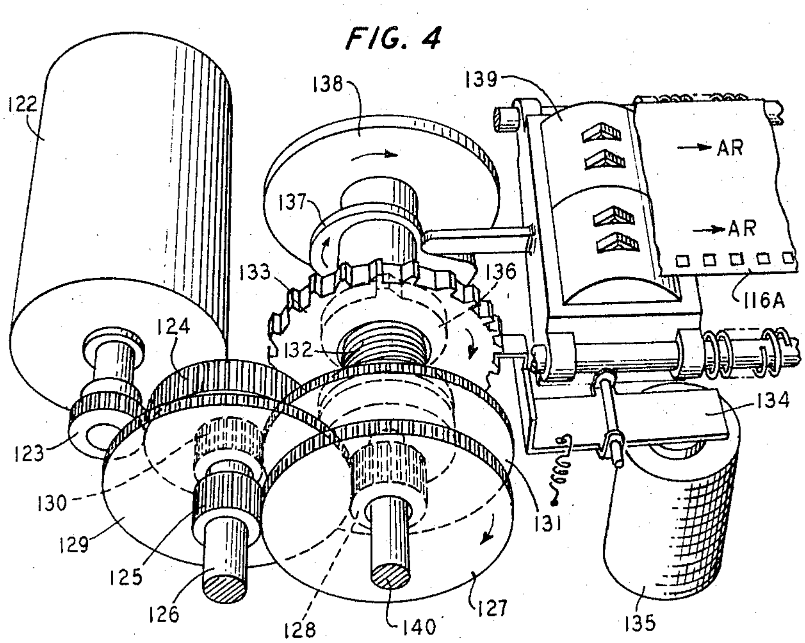
FIG. 4 is a mechanical schematic diagram, shown in perspective, of the tape head positioning portion of the mechanism shown in FIG. 2.

During the operation described above, magnetic tape 116A is moved longitudinally with respect to the record-reproduce head 139, FIG. 4. During the actual readout of a stored number, or during the recording process, a stepping solenoid 135 operates stepping armature 134 to permit a stepped advance of ratchet wheel 133 which is powered through slip clutch 132. Cam 137 is thus allowed to rotate incrementally forcing head 139 along tape 116A in the direction of the small arrows AR—AR, shown in FIG. 4. So long as the stepper solenoid 135 remains unoperated, however, motor 122 may continue to operate without affecting the position of head 139 owing to the slipping action of clutch 132. Complete details of the operation and control of head 139 in the record and readout mode are disclosed in the copending application of D. D. Huizinga and T. B. Prince, Ser. No. 419,517, filed Dec. 18, 1964.

At the same time that power is being applied, as described above, to drive tape sprockets 116 and 120, FIG. 3, driving power is also made available through gearing to rotate circuit disc 104. In effect, circuit disc 104 starts to chase selector wheel 102 whenever the position of selector wheel 102 is changed. The drive for circuit disc 104 is taken from gear 115, FIGS. 2 and 3, and is then applied by way of gears 114, 113 and 112 to gear and disc assembly 103. Motor 122 continues to operate until circuit disc 104 is driven to its initial position in relation to selector wheel 102, at which point the operating paths for both motor 122 and solenoid 147 are opened. The back spring contact of switch 150 bears against idler arm 145, returning it to its normal position which, in turn, disengages the drive gears.

If, instead of the operation described above, selector wheel 102 is rotated counterclockwise with respect to disc 104, an operating circuit for relay 148 is completed by disc 104 between contacts 11A and 11B. The resulting operation of transfer contacts 149 of relay 148 effects a reversal in the power supply leads to motor 122, and motor 122 drives in the opposite direction.

The fine-adjust or vernier mode of operation, which is employed to position a particular recorded name and number within a prepositioned group, is effected through selector wheel 143. Selector wheel 143 is normally held in position by a swing arm 202, FIG. 2, which is mounted for spring loaded rotational movement about pin 201. Wheel 143 is depressed and swings downwardly against the force of spring loading, bringing the teeth on wheel 143 into meshing relation with gear 121A of slip clutch assembly 121. Driving force is then applied through clutch assembly 121 and the gear train described above to rotate magnetic tape sprocket 116 and display tape sprocket 120, shown in FIG. 3. In the fine-adjust mode, detent 110, FIG. 2, overrides detent 111 and selector wheel 102 turns with gear and disc assembly 103, that includes circuit disc 104, thus keeping the system in synchronism.

In accordance with the invention, means are provided to preclude interference between the vernier selector mechanism and the head positioning mechanism during the recording and automatic dialing modes of operation. Specifically, whenever head 139 is stepped, shaft 140 is rotated which in turn rotates a lock cam 141. The cam surface on lock cam 141 drives the end of lock-out arm 142 downwardly, causing it to pivot on pin 142A. The upper end of lock-out arm 142 thus swings upwardly to bear against the swing arm 202. Selector wheel 143 is thus locked in place and cannot be depressed into meshing relation with other gears in the system.

Various lock and stop mechanisms are employed in accordance with the invention to provide certain limits and controls on the operation of selector wheel 102. Specifically, a stop member 107 on selector wheel 102 coming into contact with a fixed stop member 106 limits the travel of selector wheel 102 to a single revolution. Stop member 108 limits the deflection of detent spring 110 and also limits the relative motion between selector wheel 102 and circuit disc 104 to a maximum of 180°. After an 180° arc of travel, stop 108 is engaged by tab 109. This arrangement ensures against selector wheel 102 being left in a position, when power is not applied, that would permit the mechanism to be driven to a non-selected location upon the application of power. With power on the system, circuit disc 104 in effect chases selector wheel 102 and stop 108 does not contact tab 109, thus alowing a full revolution of selector wheel 102 during the selecting process.

Figure 5:
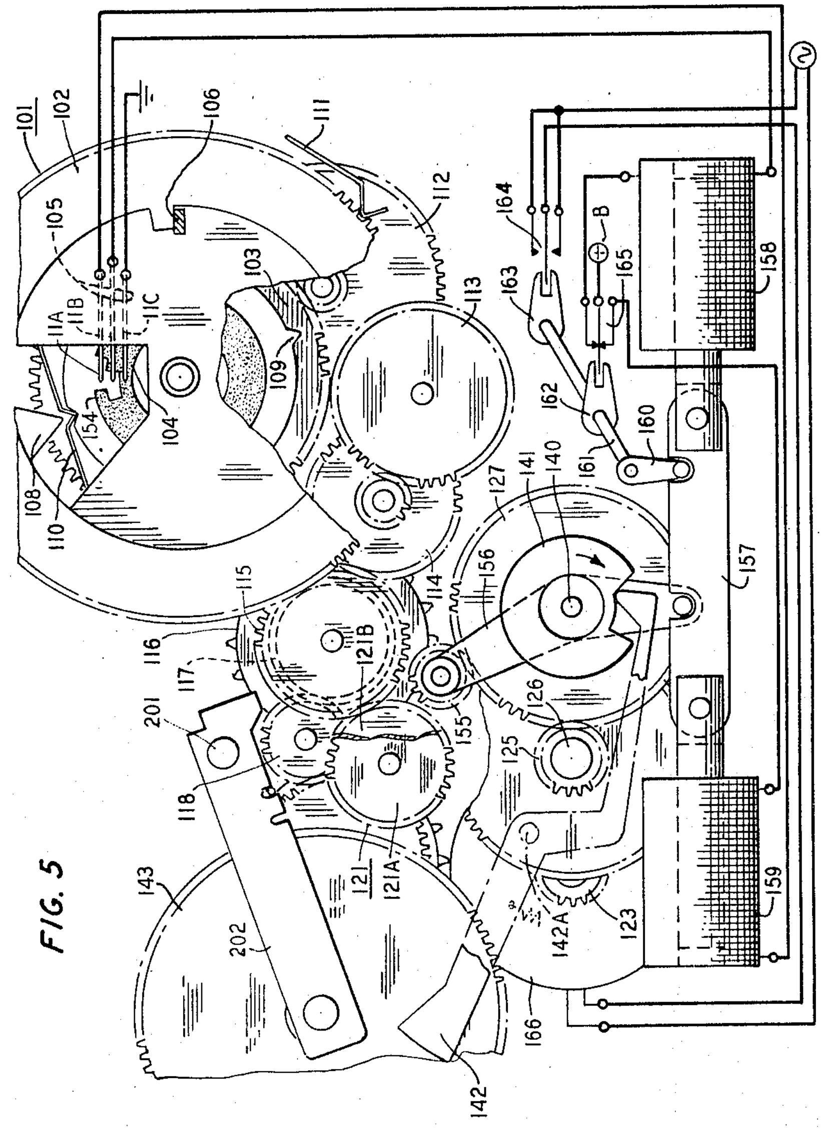
FIG. 5 is a combined mechanical and electrical schematic diagram of a modified form of the mechanism shown in FIG. 2.

A slightly modified control arrangement, in accordance with the invention, is illustrated by the apparatus shown in FIG. 5. In lieu of a reversible motor, a motor 166 with a single direction of drive is employed. The direction of gear train drive is determined by the operation of one of two solenoids 158 or 159. Battery B is applied to each of the solenoids 158 and 159 through switch contacts 165. The positioning of brush contacts 11A, 11B and 11C with respect to circuit disc 104 determines whether ground is applied to complete a circuit for the operation of solenoid 158 or for the operation of solenoid 159. When one of the solenids 158 or 159 is operated, connecting link 157 operates bell crank 160, and switch actuator crank 162 operates contacts 165 to remove battery from the non-operated solenoid. Crank 163 operates contacts 164 to apply power to motor 166. Connecting link 157, depending upon its direction of movement, rotates swing arm 156 on shaft 140 to position gear 155 in driving relation with gear 121B or with gear 115, the position being determinative of the driving direction for the entire system. In other respects, the arrangement shown in FIG. 5 is substantially identical to the arrangement shown in FIG. 2 and described above.

Figure 6:
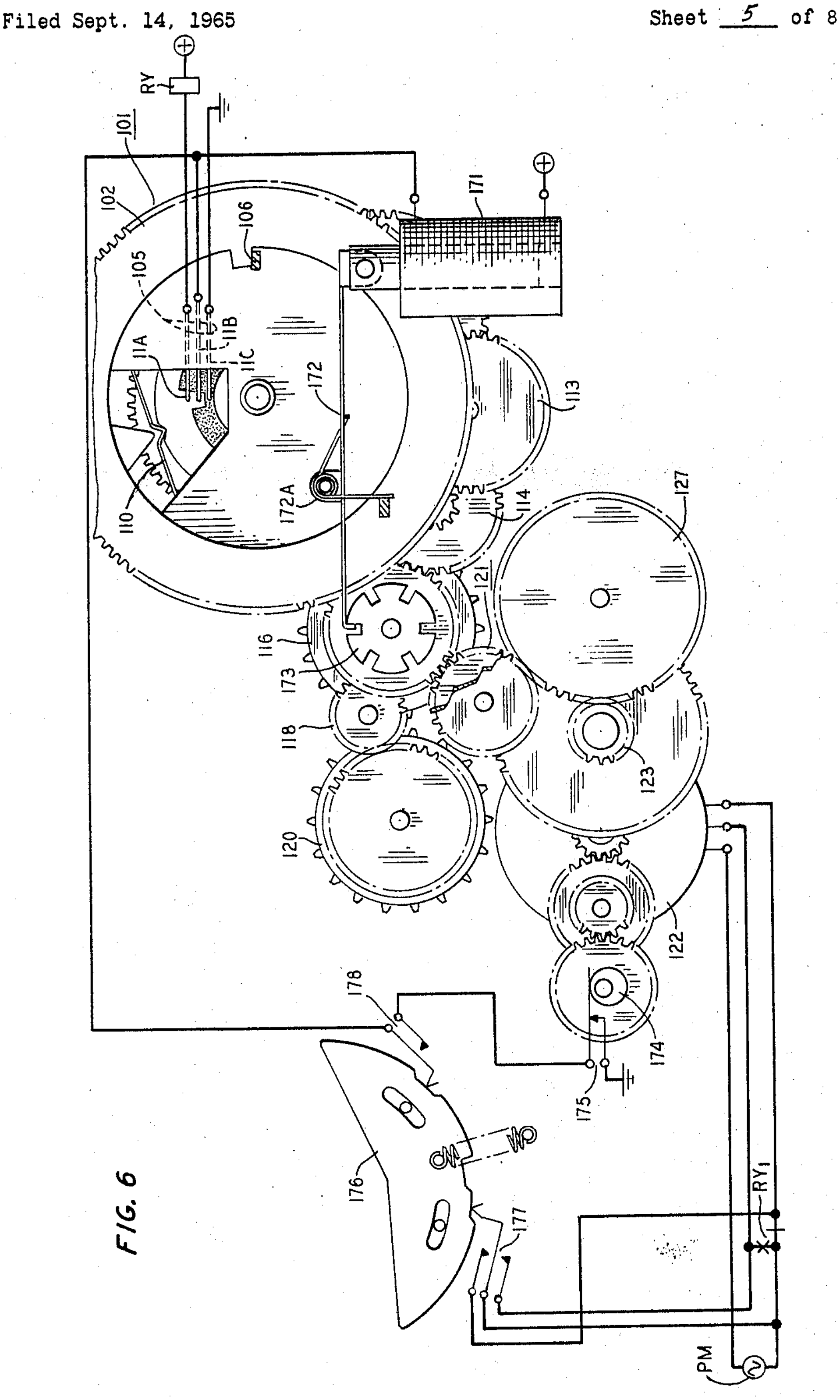
FIG. 6 is a combined mechanical and electrical schematic diagram of a telephone repertory dialer selector mechanism in accordance with a second form of the invention.

In accordance with one variant of the invention, the fine-adjust or vernier mode of operation of the selector mechanism is effected through a powered stepping drive arrangement rather than by the manual continuous drive arrangement shown in FIG. 2. In FIG. 6, a rocker switch 176 is shown in an intermediate or neutral position. When rocker switch 176 is moved off neutral in either direction, switch 178 is closed to complete a path from ground to stepping solenoid 171. Armature 172 operates against a restraining force from spring 172A to release ratchet gear 173. The movement of rocker switch 176 also operates contacts 177 to apply power from source PM to reversible motor 122 either in one direction or the other, depending on the direction of movement of rocker switch 176. With motor 122 operating, cam 174 periodically opens switch 175 to give solenoid 171 its stepping action. The gearing is designed to provide a relatively slow speed drive as compared to the relatively high speed drive that is employed during the coarse positioning mode of operation. Only a part of the gear train structure shown in FIG. 2 is shown in FIG. 6, inasmuch as operation during the coarse or group selection mode is substantially the same for the arrangement shown in FIG. 6 as for the arrangement shown in FIG. 2 and described above.

Figure 7:
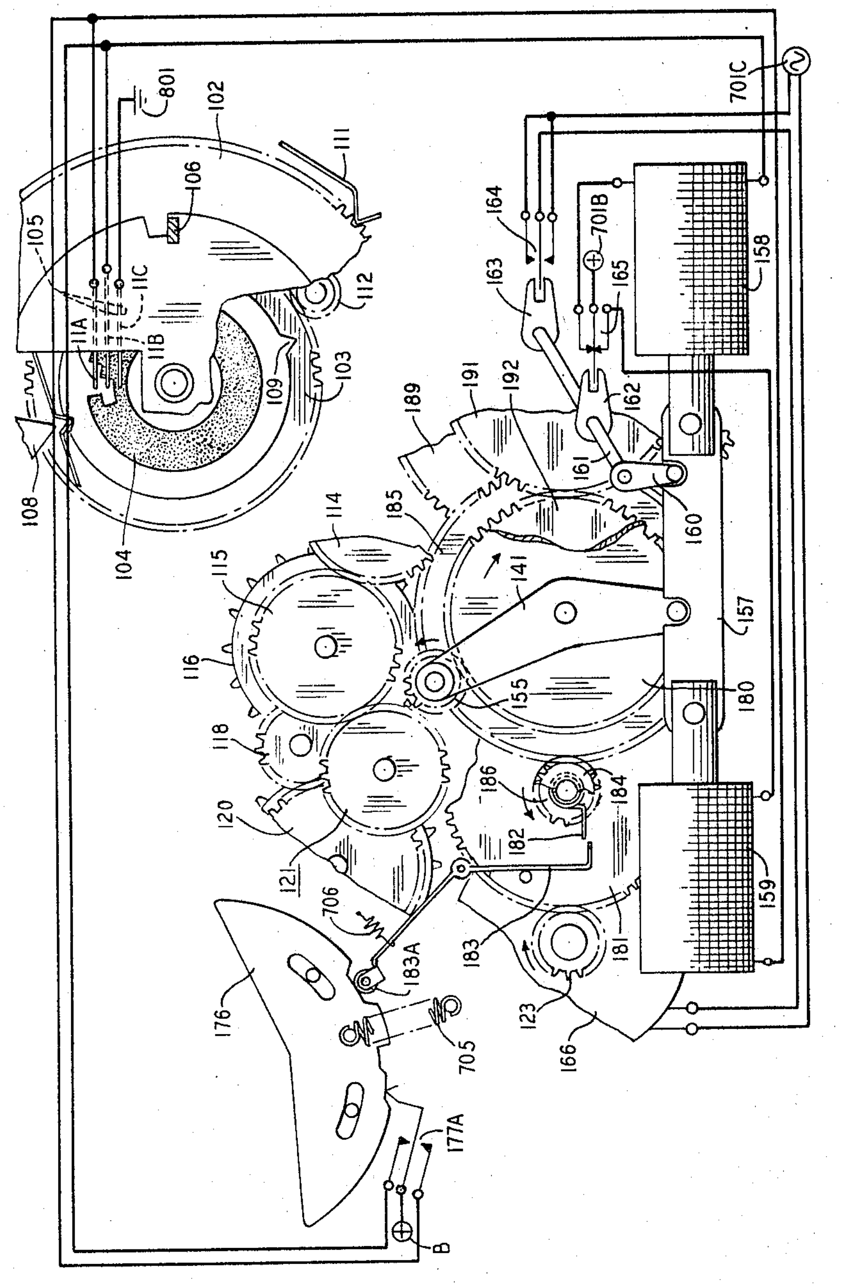
FIG. 7 is a combined mechanical and electrical schematic diagram of a modified form of the mechanism shown in FIG. 6.
Figure 8:
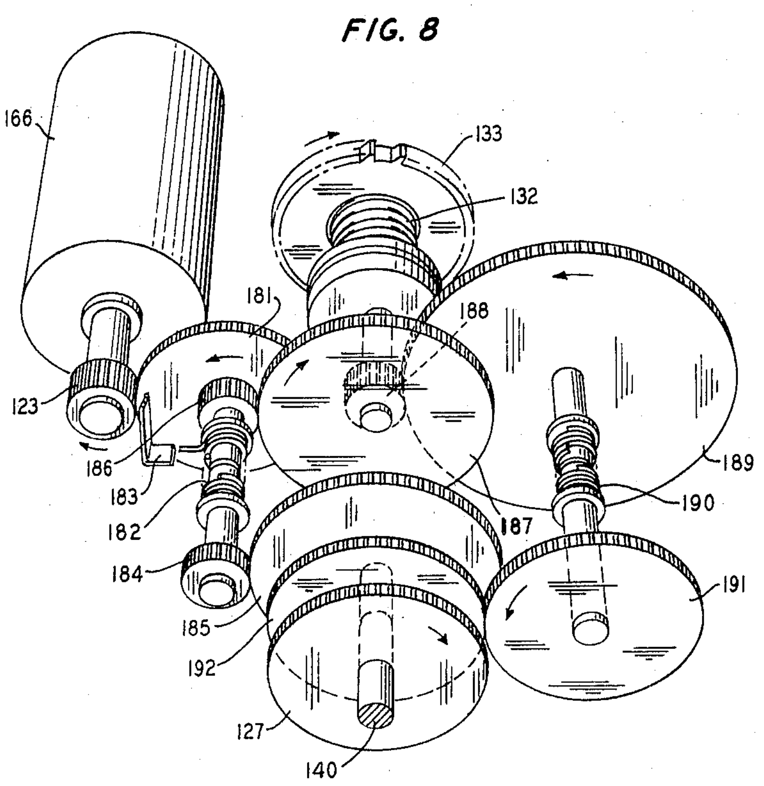
FIG. 8 is an enlarged view in perspective of the clutch mechanisms shown in FIG. 7.

Another variant of the invention is illustrated by the arrangement shown in FIG. 7. In FIG. 7 group selection is effected in the same manner as described above in connection with the discussion of FIG. 5. In the fine-adjust mode, however, a continuous rather than a ratchet drive is employed. With the operation of rocker switch 176 in either direction, the positioning of follower 183A shifts clutch lever 183 to engage band clutch 182. Band clutch 182 and associated gearing are shown in detail in FIG. 8. With motor 166 operating and band clutch 182 locked by clutch lever 183, drive is transmitted through gears 184 and 185 to turn shaft 140. Gear 127 is thus driven, and operation from that point on is as described above in the discussion of FIG. 2.

In FIG. 7 the direction of operation of rocker switch 176 determines the position of contacts 177A which in turn determines which of the 2 solenoids 158 or 159 is operated. Direction control is therefore substantially identical to that described above in the discussion of FIG. 5.

It is to be understood that the embodiment described herein is merely illustrative of the principles of the invention. Various modifications thereto may be effected by persons skilled in the art without departing from the spirit or scope of the invention.

What is claimed is:

1. In a telephone repertory dialer, in combination, first storage means for magnetically recording indicia of directory numbers, second storage means for recording visual indicia of said directory numbers, first selector means having visual indicia thereon, each of said last named indicia cerresponding to a particular group of said directory numbers, power driven means responsive to the manual positioning of said selector means to a point at which one of said visual indicia on said selector means corresponds to a reference marker for moving said first and second storage means to positions at which a preselected group of said indicia on said first storage means and a corresponding group of said indicia on said second storage means correspond, respectively, to first and second reference markers, and manually positionable means for shifting the position of said first and second storage means to a point at which one of said indicia in said preselected group on said first storage means and a corresponding one of said indicia on said second storage means are shifted to correspond, respectively, with said first and second reference markers, whereby said dialer is conditioned for automatically dialing out signals corresponding to said one indicia, said selector means further including a rotatable logic circuit disc member having a coded pattern of conductive and nonconductive areas thereon, said selector means further including a selector wheel member concentrically mounted for rotational movement about said disc, brush contacts affixed to said wheel member and mounted in cooperative relation to said disc, said contacts and said disc being in circuit relation to said power driven means, and means driven by said power driven means for automatically extending a rotational driving movement to said disc until the relative rotational position of said disc and said selector wheel matches a relative rotational reference position.

2. In a telephone repertory dialer, in combination, first storage means for magnetically recording indicia of directory numbers, second storage means for recording visual indicia of said directory numbers, first selector means having visual indicia thereon, each of said last named indicia corresponding to a particular group of said directory numbers, power driven means responsive to the manual positioning of said selector means to a point at which one of said visual indicia on said selector means corresponds to a reference marker for moving said first and second storage means to positions at which a preselected group of said indicia on said first storage means and a corresponding group of said indicia on said second storage means correspond, respectively, to first and second reference markers, and manually positionable means for shifting the position of said first and second storage means to a point at which one of said indicia in said preselected group on said first storage means and a corresponding one of said indicia on said second storage means are shifted to correspond, respectively, with said first and second reference markers, whereby said dialer is conditioned for automatically dialing out signals corresponding to said one indicia, said selector means further including a rotatable logic circuit disc member having a coded pattern of conductive and nonconductive areas thereon, said selector means further including a selector wheel member concentrically mounted for rotational movement about said disc, brush contacts affixed to said wheel member and mounted in cooperative relation to said disc, said contacts and said disc being in circuit relation to said power driven means, and means driven by said power driven means for automatically extending a rotational driving movement to said disc until the relative rotational position of said disc and said selector wheel matches a relative rotational reference position, said dialer further including a relay and a solenoid in circuit relation with said contacts, said power driven means including a motor, said relay including contacts for establishing the direction of drive of said motor, and means responsive to the operation of said solenoid for shifting said gear train into driving relation with said first and second storage means.

3. In a repertory dialer telephone set, in combination, magnetizable storage means for storing signal indicia of directory numbers to be dialed out automatically, means for storing visual indicia of stored ones of said signal indicia, a record-reproduce head, motor means, means driven by said motor means for shifting the relative position of said head and said magnetizable storage means as said signal indicia are stored and as corresponding signal indicia are dialed out automatically, first manually positionable means for indicating visually the identity of a preselected group of stored ones of said signal indicia, means responsive to said manually positionable means driven by said motor means for automatically shifting the relative position of said head and said magnetizable storage means to a position corresponding to said preselected group and for simultaneously and synchronously shifting the position of said visual storing means to a position corresponding to said preselected group, and second manually positionable means for simultaneously and synchronously shifting the relative position of said head and said magnetizable storage means to correspond with a preselected one of said indicia in said preselected group, thereby to condition said set for the automatic dialing out of a preselected stored directory number, said first manually positionable means comprising a selector wheel concentrically mounted for rotation, a circuit disc mounted with said wheel, electrically conductive contacts mounted on said wheel in circuit relation with said motor and in commutator-brush relation with said disc as said wheel is offset manually with respect to said disc, means driven by said motor means for rotating said disc with respect to said wheel until a position of relative reference between said wheel and said disc is attained, and means responsive to said second manually positionable means for simultaneously rotating both said wheel and said disc thereby to maintain the selector system in synchronism.

4. In a repertory dialer telephone set, in combination, a magnetic tape for storing signal indicia of directory numbers, a record-reproduce head, a second tape for storing visual imprinted indicia of said directory numbers, a first reference marker, a first selector wheel having visual indicia thereon corresponding to said imprinted indicia, a second reference marker, a set of brush contacts mounted on said selector wheel, a motor, a first gear train, a circuit disc in touching contact with said brush contacts mounted concentrically with said selector wheel, means including said motor and said first gear train responsive to the manual offsetting of said selector wheel rotationally with respect to said circuit disc to a point at which one of said selector wheel indicia corresponds to said second reference marker for positioning said magnetic tape to a point at which said head is in juxtaposition with one of said signal indicia in a group of said signal indicia corresponding to said selector wheel indicia indicated by said first reference marker and for shifting said second tape to a point at which a group of said imprinted indicia corresponds to said first reference marker, means including said motor responsive to said offsetting for rotating said disc back to the position of rotational correspondence with said selector wheel that existed prior to said offsetting, whereupon the circuit of said motor is opened by said brush contacts, and a second selector wheel for positioning said tapes to a point at which a preselected one of said signal indicia in said group of signal indicia is in juxtaposition with said head and at which a corresponding preselected one of said imprinted indicia is in correspondence with said first reference marker, whereby said set is conditioned for automatically dialing out a preselected directory number.

5. Apparatus in accordance with claim 4 including means driven by said motor, responsive to movement of said second selector wheel for effecting a fine motor driven continuous adjustment in the position of said tapes and means responsive to the movement of said second selector wheel for maintaining a synchronous relation between said disc and said first selector wheel.

6. Apparatus in accordance with claim 4 including means driven by said motor, responsive to movement of said second selector wheel for effecting a fine motor driven stepping adjustment in the position of said tapes and means responsive to the movement of said second selector wheel for maintaining a synchronous relation between said disc and said first selector wheel.

References Cited

UNITED STATES PATENTS

| | | | |
|---|---|---|---|
| 2,900,132 | 8/1959 | Burns et al. | 179—100.2 |
| 3,204,046 | 8/1965 | Ries | 179—90 |
| 3,229,042 | 1/1966 | Kilburg | 179—90 |
| 3,364,314 | 1/1968 | Huizinga et al. | 179—90 |

KATHLEEN H. CLAFFY, *Primary Examiner.*

ALBIN H. GESS, *Assistant Examiner.*